(12) United States Patent
Mondain-Monval et al.

(10) Patent No.: US 10,978,037 B2
(45) Date of Patent: Apr. 13, 2021

(54) ACOUSTIC METAMATERIAL FOR ISOLATION AND METHOD FOR THE PRODUCTION THEREOF

(71) Applicants: CENTRE NATIONAL DE LA RECHERCHE SCIENTIFIQUE, Paris (FR); INSTITUT POLYTECHNIQUE DE BORDEAUX, Talence (FR); UNIVERSITE DE BORDEAUX, Bordeaux (FR)

(72) Inventors: Olivier Mondain-Monval, Bordeaux (FR); Thomas Brunet, Bordeaux (FR); Aurore Merlin, Bordeaux (FR); Kévin Zimny, Bordeaux (FR); Artem Kovalenko, Bordeaux (FR); Benoît Mascaro, Bordeaux (FR)

(73) Assignees: CENTRE NATIONAL DE LA RECHERCHE SCIENTIFIQUE, Paris (FR); INSTITUT POLYTECHNIQUE DE BORDEAUX, Talence (FR); UNIVERSITE DE BORDEAUX, Bordeaux (FR)

( * ) Notice: Subject to any disclaimer, the term of this patent is extended or adjusted under 35 U.S.C. 154(b) by 610 days.

(21) Appl. No.: 15/567,066

(22) PCT Filed: Apr. 29, 2016

(86) PCT No.: PCT/EP2016/059598
§ 371 (c)(1),
(2) Date: Oct. 16, 2017

(87) PCT Pub. No.: WO2016/174196
PCT Pub. Date: Nov. 3, 2016

(65) Prior Publication Data
US 2018/0102122 A1 Apr. 12, 2018

(30) Foreign Application Priority Data
Apr. 29, 2015 (FR) ...................................... 1553881

(51) Int. Cl.
*G10K 11/172* (2006.01)
*G10K 11/162* (2006.01)
(Continued)

(52) U.S. Cl.
CPC ............... *G10K 11/172* (2013.01); *B01J 2/06* (2013.01)

(58) Field of Classification Search
CPC .. G10K 11/172; G10K 11/162; G10K 11/165; G10K 11/168; G10K 11/16; B01J 2/06; B01J 2/02; B01J 2/00
See application file for complete search history.

(56) References Cited

U.S. PATENT DOCUMENTS 3,132,714 A * 5/1964 Nadler ...................... E04B 1/86
181/286
4,600,078 A * 7/1986 Wirt ...................... E04B 1/8409
181/286
(Continued)

FOREIGN PATENT DOCUMENTS

DE 195 39 309 A1 4/1997
DE 695 28 002 T2 1/2003
(Continued)

OTHER PUBLICATIONS

K. Zimny et al., "Soft porous silicone rubbers as key elements for the realization of acoustic metamaterials," Langmuir, Feb. 12, 2015, pp. 1-25.
(Continued)

*Primary Examiner* — Edgardo San Martin
(74) *Attorney, Agent, or Firm* — BakerHostetler (57) ABSTRACT

A porous acoustic bead resonator is provided, wherein the Young's modulus of the material of the resonator is lower
(Continued)

than 1 GPa and the porosity of the resonator is comprised between 20% and 50%, most of the pores of the resonator being filled with a gas and most of the pores being interconnected, via at least one pore, with the exterior of the resonator.

14 Claims, 11 Drawing Sheets

(51) Int. Cl.
    *G10K 11/165*     (2006.01)
    *B01J 2/06*     (2006.01)

(56) References Cited

U.S. PATENT DOCUMENTS

| | | | | |
|---|---|---|---|---|
| 5,504,281 | A * | 4/1996 | Whitney | H04R 1/02 181/286 |
| 5,744,763 | A * | 4/1998 | Iwasa | B29C 43/203 181/286 |
| 5,777,947 | A * | 7/1998 | Ahuja | A47H 23/08 181/256 |
| 7,520,369 | B2 * | 4/2009 | Dravet | B64D 29/00 181/284 |
| 8,327,973 | B2 * | 12/2012 | Parish | B29C 44/5627 181/129 |
| 10,741,160 | B1 * | 8/2020 | Gibbons | B01D 69/10 |
| 2002/0166721 | A1 * | 11/2002 | Monson | G10K 11/16 181/292 |
| 2003/0130415 | A1 | 7/2003 | Leon et al. | |
| 2011/0240402 | A1 * | 10/2011 | Chou | F16F 15/04 181/207 |
| 2012/0247867 | A1 * | 10/2012 | Yang | G10K 11/172 181/211 |
| 2018/0037976 | A1 * | 2/2018 | Yuan | C22C 1/08 |

FOREIGN PATENT DOCUMENTS

| | | |
|---|---|---|
| JP | 2014-198785 A | 10/2014 |
| WO | 2004/011537 A1 | 2/2004 |
| WO | 2010/059817 A2 | 5/2010 |
| WO | 2012/033599 A1 | 3/2012 |
| WO | 2014/206168 A1 | 12/2014 |
| WO | 2015/028760 A1 | 3/2015 |

OTHER PUBLICATIONS

Liu et al., "Locally Resonant Sonic Materials," Science, vol. 289, No. 5485, Sep. 8, 2000, pp. 1734-1736.

Brunet et al., "Soft acoustic metamaterials," Science, vol. 342, pp. 323-324, Oct. 2013.

Brunet et al., "Soft 3D acoustic metamaterial with negative index," Nature Materials vol. 14, 2014, pp. 384-388.

English Translation of Notice of Rejection issued in Japanese Patent Application No. 2017-555491 dated Jun. 2, 2020.

\* cited by examiner

ACOUSTIC METAMATERIAL FOR ISOLATION AND METHOD FOR THE PRODUCTION THEREOF

CROSS-REFERENCE TO RELATED APPLICATIONS

This application is a National Stage of International patent application PCT/EP2016/059598, filed on Apr. 29, 2016, which claims priority to foreign French patent application No. FR 1553881, filed on Apr. 29, 2015, the disclosures of which are incorporated by reference in their entirety.

FIELD OF THE INVENTION

The invention relates to acoustic metamaterials and to acoustic attenuating devices manufactured from acoustic metamaterials.

BACKGROUND

Materials for acoustic insulation may be manufactured from porous materials. It is possible for example to use open-cell porous rubbers, or materials manufactured from open-cell cross-linked polymer foams. In these nonuniform materials, acoustic waves are highly attenuated because of their scatter from nonuniformities (air-filled cavities or pores) distributed within the medium. In order to be effective, the required thicknesses of materials must be of the same order of magnitude as the incident wavelength. This condition makes the production of acoustically insulating walls difficult on account of the space that they must occupy.

In what are called "locally" resonant materials, these acoustic losses may be optimized for frequencies near the resonant frequency of inclusions (or resonators) present within the material. In such materials, the insertion of inclusions that are small in size with respect to the incident wavelength and that have a high mechanical contrast with the surrounding medium, in terms of mass per unit volume and/or compressibility, may create spectral bandgaps, allowing sound to be attenuated by several orders of magnitude in amplitude with much smaller thicknesses than in conventional materials.

In this context, Liu et al. (Liu, Z., Zhang, X., Mao, Y., Zhu, Y. Y., Yang, Z., Chan, C. T., & Sheng, P. (2000), Locally resonant sonic materials. Science, 289(5485), 1734-1736) have produced a class of sonic crystals possessing sonic bandgaps and a lattice constant two orders of magnitude smaller than the relevant wavelengths. The material, consisting in a three-dimensional lattice of resonant spheres set in an epoxy matrix, may exhibit a negative effective mass per unit volume (denoted $\rho$) in a frequency range determined by the manufacturing parameters of the material. This experimental metamaterial is however difficult to manufacture and not suitable for an industrial application.

Various devices and processes for producing acoustic metamaterials have been proposed (see for example WO2012/033599 and WO 2014/206168), these devices and processes making it possible to produce three-dimensional lattices of masses that are joined together by springs, the configuration of which allows a spectral bandgap to be created in a given frequency range. These devices and processes involve precise and expensive mechanical arrangements.

Brunet et al. (Brunet, T., Leng, J., Mondain-Monval, O., 2013, Soft acoustic metamaterials, Science, 342, 323-324) disclose the production of soft acoustic metamaterials made of porous beads of polymers, simultaneously having a negative effective mass per unit volume $\rho_{\mathit{eff}}$ and a negative effective compressibility $\chi_{\mathit{eff}}$ in a given frequency range. The phase speed $c_L$ (of sound) of a material is related to these two mechanical parameters by the following expression:

$$c_L = \frac{1}{\sqrt{\rho_{\mathit{eff}}}\sqrt{\chi_{\mathit{eff}}}} \qquad (1)$$

It is possible to show that phase speed is also negative when these two parameters are simultaneously negative. The manufacture of these beads via microfluidic methods is also disclosed.

Brunet et al. (Brunet, T., Merlin, A., Mascaro, B., Zimny, K., Leng, J., Poncelet, O., Aristégui, C., Mondain-Monval, O., 2015, Soft 3D acoustic metamaterial with negative index, Nature Materials 14, 384-388) disclose the production of a fluid metamaterial possessing a negative effective phase speed $c_L$ in an ultrasonic frequency range by virtue of the acoustic resonances of porous microbeads made of silicone rubber. These resonators are incorporated into a Bingham fluid (shear-thinning fluid behaving as a solid at a shear rate of zero and behaving as a viscous fluid at a shear rate higher than a shear threshold). They are manufactured in droplets, from a primary emulsion the volume of the internal phase of which is typically comprised between 20 and 40% of the total volume of the resonator.

In order to obtain the highest possible resonant amplitudes from the resonators, the contrast between the phase speed in the resonators and the phase speed in the matrix by which they are held must be as high as possible. The phase speed in the resonators in question decreases as their density and compressibility both increase. The technical problem is that of the manufacture of a material possessing both a high mass per unit volume and a high coefficient of compressibility, in order to minimize the speed of sound in the resonators, and to produce insulating devices that are more effective than those disclosed in the prior art.

The two aforementioned publications do not disclose how to manufacture resonators the phase speed of which is minimized, i.e. having both a maximum compressibility and a maximum effective density.

SUMMARY OF THE INVENTION

The invention aims to overcome at least one of the aforementioned drawbacks of the prior art.

One subject of the invention allowing this aim to be achieved is a porous acoustic bead resonator, characterized in that the Young's modulus of the material of said resonator is lower than 1 GPa, in that the porosity of said resonator is comprised between 20% and 50%, in that most of the pores of said resonator are filled with a gas and in that most of said pores are interconnected, via at least one pore, with the exterior of said resonator.

Advantageously, the material of said resonator is a polymer.

Advantageously, the diameter of each said pore, of the resonator, connected with the exterior of said resonator is smaller than or equal to 200 μm, preferably smaller than or equal to 100 μm and preferably smaller than or equal to 20 μm.

Another subject of the invention is an acoustic device including a plurality of resonators and a matrix surrounding said bead resonators, the speed of propagation of sound in said matrix being higher than or equal to 500 m·s$^{-1}$.

Advantageously, said matrix of the device is suitable for preventing the sedimentation of said bead resonators.

Advantageously, the matrix of the device is solid.

Advantageously, the material of said matrix of the device is a Bingham fluid.

Another subject of the invention is a process for manufacturing an acoustic resonator including at least the steps of:

a) preparing a primary emulsion between, on the one hand, an aqueous first phase and, on the other hand, a second phase including at least one type of monomer and one surfactant;

b) preparing a secondary emulsion between, on the one hand, said primary emulsion and, on the other hand, an aqueous third phase;

c) cross-linking said monomers;

d) drying.

Advantageously, the cross-linking of step c) of the method is carried out by heating.

Advantageously, the cross-linking step c) of the method is carried out via exposure to ultraviolet radiation.

Advantageously, the formation of droplets of said first phase is waited for between step b) and step c) of the method.

Advantageously, said primary emulsion of the method is prepared at least using a method chosen from: a dropwise method, a shear-mixing method using an instrument employing a mixing blade, an ultrasonic method, a flow-focusing method, a co-flow method, a T-junction method and a step-emulsification method.

Advantageously, said secondary emulsion of the method is prepared at least using a method chosen from: a dropwise method, a shear-mixing method using an instrument employing a mixing blade, an ultrasonic method, a flow-focusing method, a co-flow method, a T-junction method and a step-emulsification method.

Advantageously, the cross-linking of the monomer of said second phase is carried out, in the method, droplet by droplet of said primary emulsion in a fluidic system.

The following description presents a plurality of examples of embodiments of the device of the invention: these examples do not limit the scope of the invention. These examples of embodiments have both the essential features of the invention and additional features related to the embodiments in question. For the sake of clarity, the same elements have been referenced with the same references in the various figures.

BRIEF DESCRIPTION OF THE DRAWINGS

The invention will be better understood and other advantages, details and features thereof will become apparent from the following explanatory description, which is given by way of example with reference to the appended figures, in which.

DETAILED DESCRIPTION

Figure 1:
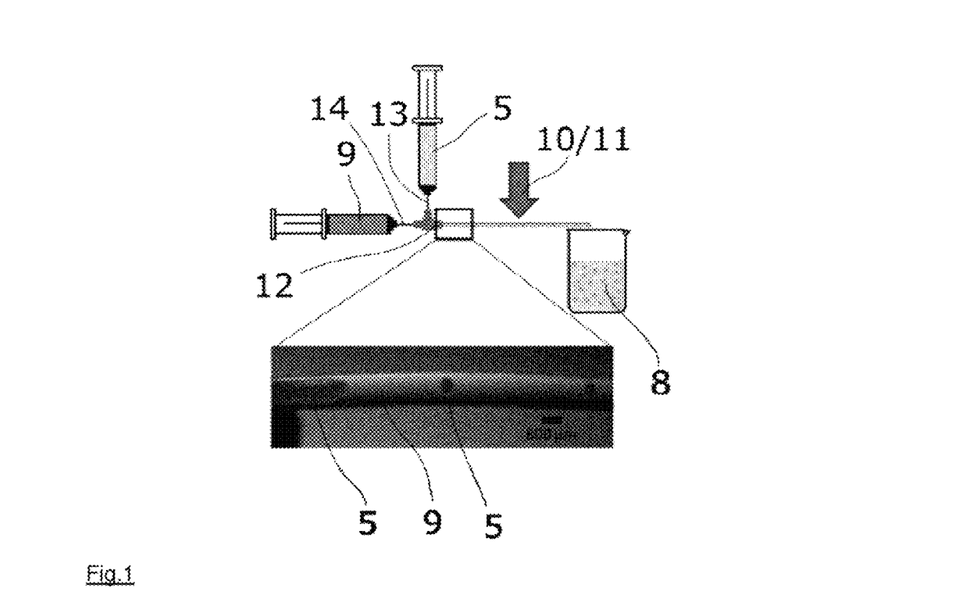
FIG. 1 is an illustration of a fluidic device used for the production of resonators 1.

FIG. 1 is an illustration of a fluidic device used for the production of resonators 1. In one example of an embodiment of the invention, first a primary emulsion 9 is prepared between, on the one hand, a aqueous first phase and, on the other hand, a second phase including at least one type of monomer and one suitable surfactant. This first emulsion may be produced using known emulsification processes which may involve:

shear mixing two fluid phases in an instrument employing a mixing blade, such as a Rayneri (registered trademark) mixer or an Ultraturrax (registered trademark) mixer, or any mechanical apparatus allowing shear mixing of two fluid phases;

applying ultrasound to the two liquid phases via an ultrasonic probe.

The surfactant chosen depends on the monomer phase chosen to produce the emulsion. Advantageously, the surfactant possesses a low hydrophilic-lipophilic balance (HLB) number. This type of surfactant allows what is referred to as an invert emulsion, i.e. of droplets of aqueous phase in a continuous lipid phase, to be preferentially formed. The diameter of the droplets of aqueous phase thus formed in the continuous monomer phase may vary between 0.2 and 100 μm and preferably between 0.2 and 10 μm. The rest of the description includes examples of primary emulsion composition.

The second step consists in preparing a secondary emulsion 8 between, on the one hand, the primary emulsion 9 and, on the other hand, an aqueous third phase 5. In one example of an embodiment of the invention, this secondary emulsion is prepared using a fluidic, millifluidic or microfluidic device. In one example of an embodiment of the invention, a co-flow 12 is used to form the secondary emulsion. The primary emulsion 9 and the aqueous third phase 5 are placed beforehand in syringes. The primary emulsion is, in the example of FIG. 1, injected at a controlled flow rate by a syringe pump (for example a Harvard PHD 22/2000, registered trademark) into a first flexible capillary tube (made of perfluorinated ethylene propylene, of 500 μm inside diameter and 800 μm outside diameter). The aqueous third phase 5 is injected into a second capillary tube (perfluorinated ethylene propylene, of 1 mm inside diameter and 1.6 mm outside diameter) by a pressure controller (AF 1 1600, Elveflow, registered trademark). The first capillary tube is inserted into the second capillary tube in order to allow a co-flow to be achieved. The inset of FIG. 1 is a photograph of a capillary tube in the location where the droplets form by co-flow 12. On the left of the photograph, a cylindrical jet of primary emulsion 9 is encircled by aqueous third phase 5. Plateau-Rayleigh instabilities provoke the formation of droplets (example at the center of the photograph and to the right).

It is also possible to prepare the secondary emulsion by shear mixing the invert emulsion in an aqueous third phase 5 containing a surfactant the composition of which is suitable for forming the emulsion, for example a surfactant of high HLB number.

In the embodiment of the invention illustrated in FIG. 1, the droplets formed from the co-flow may be cross-linked directly after their formation. The cross-linking may be carried out on-line, i.e. droplet by droplet, in a precise location of the co-flow outlet capillary tube. This polymerization may be carried out thermally or with ultraviolet radiation, depending on the compounds used and on the organic second phase. The resonators 1 thus produced by polymerization of the droplets formed from the co-flow are therefore generally made of polymeric material.

In one example of an embodiment of the invention, the organic second phase includes the oil Silcolease UV 200 (registered trademark Bluestar Silicones), 4% by weight of the catalyst Silcolease UV cata 211 (registered trademark Bluestar Silicones), 20% by weight of the surfactant DC3225C (Dow Corning) and 200 ppm of Genocure ITX (Rahn). The saline aqueous first phase is composed of 1.5% by weight NaCl. The porosity of the resonator is dependent on the amount of aqueous first phase incorporated into the organic second phase. The aqueous third phase is in this example a glycerol solution. After droplet formation, it is possible to polymerize the droplets formed with ultraviolet radiation 11 (BlueWave 200 lamp, Dymax) localized on the capillary tube downstream of the droplet formation.

In another example of an embodiment of the invention, the organic second phase includes 64% ethylhexyl acrylate, 5.5% styrene, 10.5% divinylbenzene and 20% by weight of the surfactant SPAN 80. The aqueous first phase is composed of a solution of 25 mM sodium chloride and 5 mM potassium peroxodisulfate. In the same way as in the preceding example, the porosity of the resonator is dependent on the amount of aqueous first phase incorporated into the organic phase. During the preparation of the second emulsion using the fluidic process illustrated in FIG. 1, the droplets are polymerized by locally heating a cylinder of the co-flow outlet capillary tube to 60° C. The manufactured beads may then be washed in acetone then ethanol.

In a last manufacturing step of the invention, the manufactured bead resonators are collected then dried. In order to dry the resonators, it is for example possible to leave them in open air, or indeed to place them in an oven at 40° C. This step will be described in detail below with reference to the figures.

In other embodiments of the invention, it is possible to prepare the primary emulsion dropwise, by shear-mixing using an instrument employing a mixing blade, ultrasonically, by flow focusing, using a T-junction or by step emulsification.

In other embodiments of the invention, it is possible to prepare the secondary emulsion dropwise, by shear-mixing using an instrument employing a mixing blade, ultrasonically, by flow focusing, using a T-junction or by step emulsification.

Figure 2:
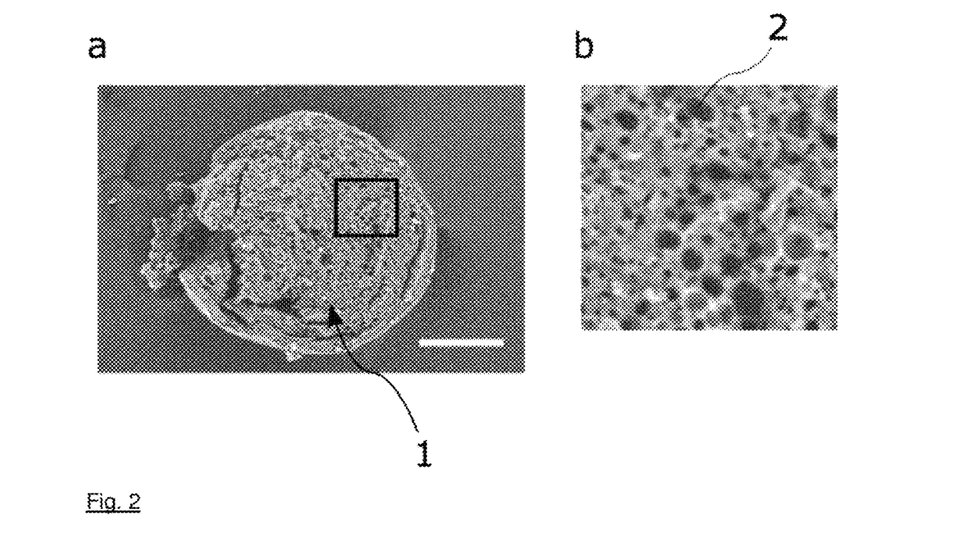
FIG. 2 shows scanning electron micrographs of a resonator that is different from the invention.

FIG. 2 shows scanning electron micrographs of a resonator that is different from the invention. Panel a of FIG. 2 shows a micrograph of the cross section of a resonator before the drying step described above. The scale bar shown represents 100 μm. Panel b of FIG. 2 shows a detail of the micrograph of panel a, bounded by a black frame in panel a. The micrographs of FIG. 2 shows a bead resonator manufactured according to the process described with reference to FIG. 1 and the porosity of which, before the drying step, is 30%. It may be seen in panel b of FIG. 2 that the pores of a resonator before drying are not connected: there are only rarely connections allowing a gas or a liquid to be transported from one pore to the next.

Figure 3:
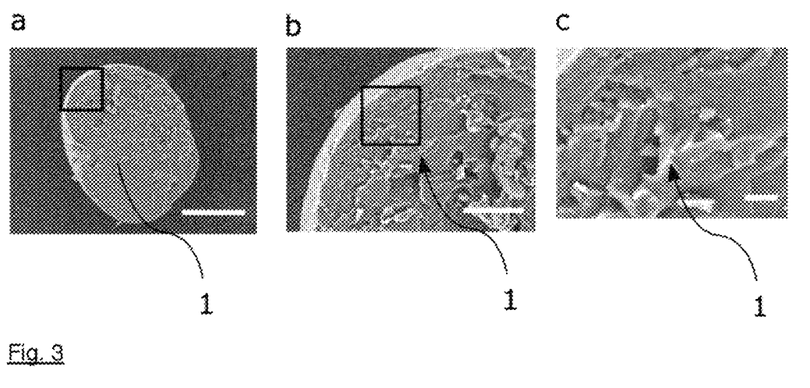
FIG. 3 shows scanning electron micrographs of a resonator fabricated using the same process as the resonator presented in FIG. 2.

FIG. 3 shows scanning electron micrographs of a resonator manufactured according to the same process as the resonator presented in FIG. 2. Panel a of FIG. 3 shows a micrograph of the cross section of the resonator, after the drying step described above. The scale bar shown represents 200 μm. Panel b of FIG. 3 shows a detail of the micrograph of panel a, bounded by a black frame in panel a. The scale bar shown represents 50 μm. Panel c shows a detail of the micrograph of panel b, bounded by a black frame in panel b. The scale bar shown represents 10 μm. The porosity of the presented resonator, which is different from the invention, is substantially zero after the drying step.

Figure 4:
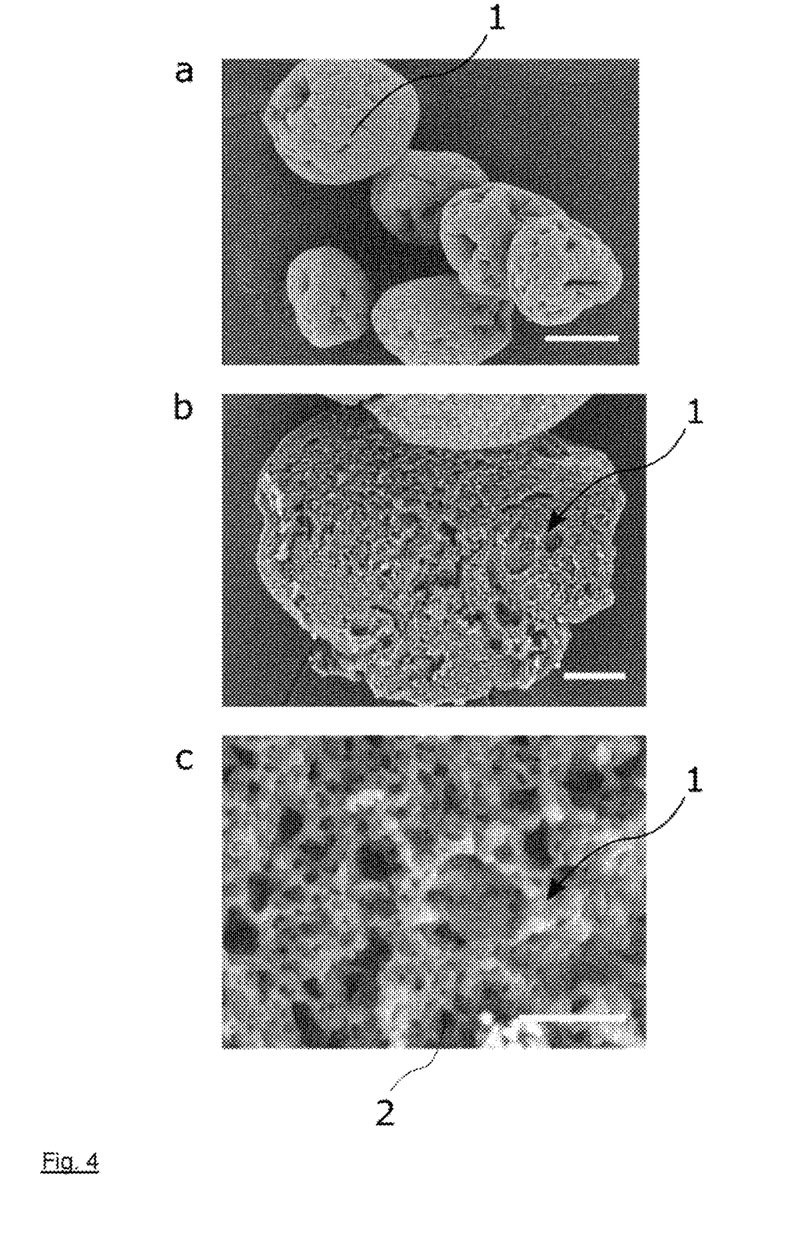
FIG. 4 shows scanning electron micrographs of resonators that are different from the invention.

FIG. 4 shows scanning electron micrographs of resonators that are different from the invention. Panel a of FIG. 4 shows a micrograph of six resonators after the drying step described above. The scale bar shown represents 200 μm. For the same resonators, the porosity of the resonators is 70% before the drying step described in the process of FIG. 1. This porosity is obtained by adjusting the proportion of aqueous first phase during the preparation of the first emulsion. The resonators of panel a have a bead shape before the drying step, but gradually deform during the drying step, ending up with the shapes that may be seen in panel a. Panel b of FIG. 4 is a micrograph of a cross section of a resonator manufactured according to the same process as the resonators presented in panel a of FIG. 4. The scale bar shown represents 50 μm. Panel c of FIG. 4 is a micrograph showing a detail of a cross section of a resonator manufactured according to the same process as the resonators presented in panel a of FIG. 4. The scale bar shown represents 10 μm. The resonator presented in panel c of FIG. 4 includes a high proportion of closed pores. Under the effect of the contractions undergone by a bead during the drying, the closed pores of the resonator deform and become non-spherical. The initially high porosity thus becomes very low because most of the pores close up.

Figure 5:
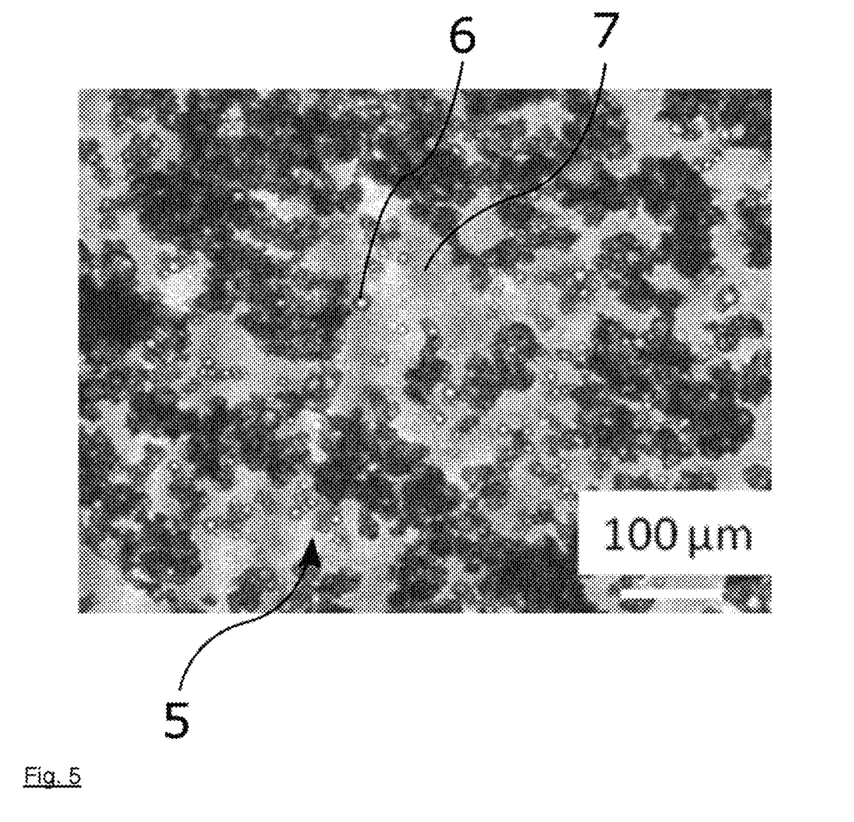
FIG. 5 is an optical micrograph of a primary emulsion 5 according to one embodiment of the invention.

FIG. 5 is an optical micrograph of a primary emulsion 9 according to one embodiment of the invention. The primary emulsion is prepared between an aqueous saline first phase 6 including 1.5% by weight sodium chloride and an organic second phase 7 including the oil Silcolease UV POLY200 (registered trademark, Bluestar Silicones), 4% by weight of catalyst (iodonium borate), 200 ppm of ultraviolet-sensitive compound (isopropylthioxanthone, ITX) and 0.4% by weight of the surfactant PDMS (poly(ethylene oxide) (PEO)-block-PDMS, Silube J208-812, Siltech, registered trademark). The aqueous saline first phase is introduced little by little into the organic second phase under shear in a mortar. The final volume fraction of aqueous phase may for example be chosen to be between 5 and 80% using this method and preferably between 20% and 40%. The droplets of aqueous phase in the organic second phase have an adhesive behavior with respect to one another. They tend, after a characteristic time, to form bunches, whatever the volume fraction of aqueous phase in the organic phase. The average diameter of the droplets of the internal emulsion 9 is comprised between 0.2 and 100 μm depending on the emulsification method used (shear mixing of two fluid phases using an instrument employing a mixing blade, such as a Rayneri (registered trademark) mixer or Ultraturrax (registered trademark) mixer, or any mechanical apparatus allowing two fluid phases to be shear mixed, or even by application of ultrasound to the two liquid phases using an ultrasonic probe).

Zimny et al. (Zimny, K., Merlin, A., Abdoulaye, B. S., Aristégui, C., Brunet, T., Mondain-Monval, O., 2015, Soft porous silicon rubbers as key elements for the realization of acoustic metamaterials, Langmuir) disclose a method for manufacturing a porous material in wafers, of a diameter of about 10 cm, from the emulsion described with reference to FIG. 5.

Figure 6:
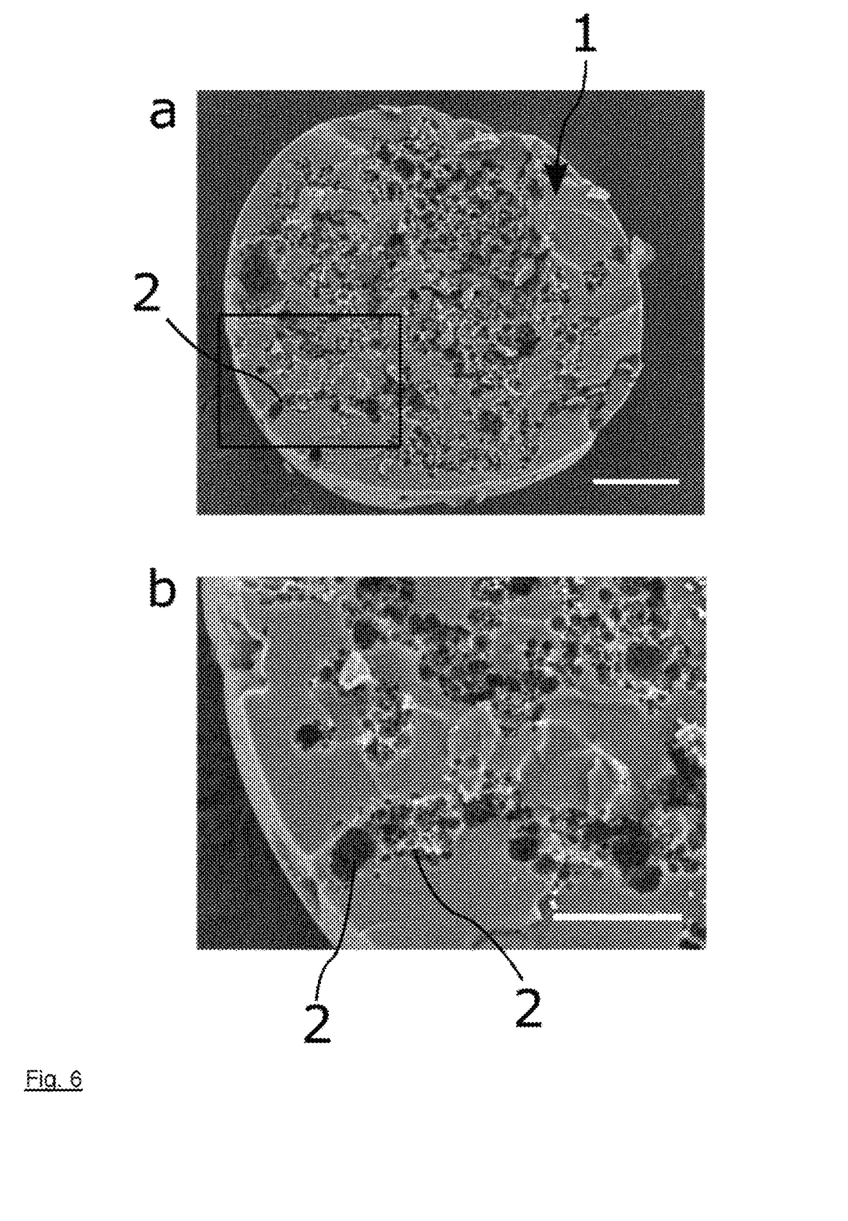
FIG. 6 shows scanning electron micrographs of a resonator according to one embodiment of the invention.

FIG. 6 shows electron scanning micrographs of a resonator according to one embodiment of the invention. Panel a is a micrograph of the cross section of a resonator according to one embodiment of the invention. This resonator was prepared with the emulsion described with reference to FIG. 5 and using the process described with reference to FIG. 1. The scale bar shown represents 100 μm. Panel b shows a detail of panel a, indicated by a black frame in panel a. The scale bar shown represents 50 μm. The inventors have discovered that using this process for preparing resonators and the emulsion described with reference to FIG. 5, most of the pores 2 of the resonators are closely spaced and interconnected. Generally, the radius of a resonator 1 according to the invention may be comprised between 1 μm and 10 mm, and is preferably between 100 μm and 1 mm. The resonant frequency is inversely proportional to the size of the resonators 1. For example, the resonant frequency of a resonator 1 of radius equal to 100 μm, surrounded by a matrix 4, for example a Bingham fluid, is 200 kHz and that of a resonator of radius equal to 1 mm is 20 kHz. Generally, the resonant frequency of a resonator 1 is comprised between 2 kHz and 20 MHz.

Before cross-linking, two neighboring droplets are separated by a liquid phase. The inventors have discovered that the cross-linking and drying steps allow an interconnection between the pores, observed a posteriori. The porosity after all the manufacturing steps, in this embodiment of the invention, remains equal to the volume fraction of introduced aqueous first phase, i.e. 30% (unlike in the resonators shown in FIG. 2 and FIG. 3).

The final porosity of the resonator results from a combination between two effects or parameters:

a volume fraction of aqueous first phase that is sufficiently low to allow a resonator to be manufactured the structure of which does not collapse in on itself during the drying step (as during the drying of the resonators of FIG. 4);

interconnection of the pores with one another and with the exterior of the resonator makes possible a drying mechanism that is direct, i.e. between the exterior of the resonator and the aqueous phase, i.e. no polymer membrane is passed through. This drying mechanism allows the aqueous first phase to be replaced by a gas originating from the exterior of the resonator, contrary to the embodiment of FIG. 3 or FIG. 4.

More generally, the inventors have discovered the relationship between the surfactant used in the embodiment of FIG. 5 and the drying of the resonators. The surfactant used in FIG. 5 (Silube) allows the droplets to have an adhesive behavior with respect to one another. They may then form bunches of droplets. More generally, it is possible to use any other surfactant allowing the droplets to behave in a similar way in the primary emulsion. The surfactant used determines the arrangement of the droplets before the cross-linking of the organic second phase. It allows the resonator to include networks of pores that are interconnected with one another and with the exterior of the resonator after this cross-linking. This manufacturing method makes it possible to avoid having to introduce a high proportion of aqueous first phase (typically higher than or equal to 70%) into the organic second phase (the aim of which is to compress the aqueous droplets against one another in order to promote the interconnection of the pores during the cross-linking of the organic phase). In this embodiment, the density of the resonator and its compressibility are both optimized.

In various embodiments of the invention, the polymers used to manufacture a resonator may be chosen from PDMS (polydimethylsiloxane), a blend of polyacrylate and polystyrene, an agarose gel and an acrylamide gel. More generally, polymers of low shear modulus may be used.

Figure 7:
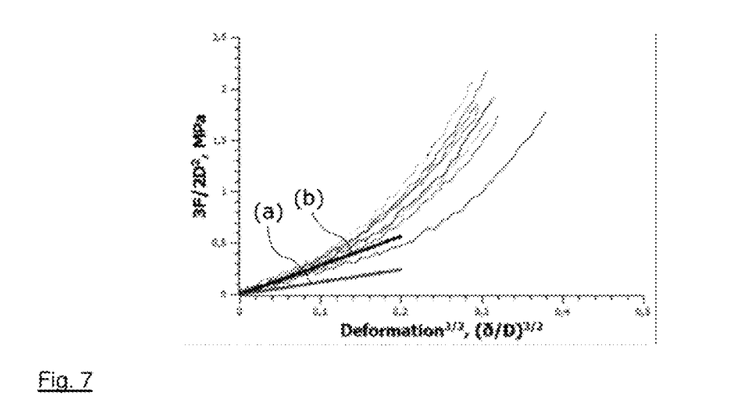
FIG. 7 is a mechanical characterization of a plurality of bead resonators that are different from the invention.

FIG. 7 is a mechanical characterization of a plurality of bead resonators that are different from the invention. A bead resonator is placed on a steel sheet. The resonator possesses a diameter D, a Poisson's coefficient v and a shear modulus G. H is the distance that separates the steel sheet from a driver located above the bead. A normal force F is applied to the bead by the driver.

δ is defined by:

$$\delta = D - H \quad (2)$$

and Young's modulus E by:

$$E = 2G(1+v) \quad (3)$$

Applying Hertzian theory, the normal force F applied to the bead is related to δ by:

$$\frac{3F}{2D^2} = \frac{G}{1-v}\left(\frac{D-H}{D}\right)^{3/2} = \frac{G}{1-v}\left(\frac{\delta}{D}\right)^{3/2} \quad (4)$$

where the effective shear G* and the effective Young's modulus E* are related by:

$$G^* = \frac{G}{1-v} = \frac{E^*}{2} \quad (5)$$

In the small-strain regime, F varies linearly with the ratio $(\delta/D)^{3/2}$.

FIG. 7 illustrates the variation in the applied normal force, normalized by $(3/2) \cdot D^2$, as a function of the ratio $(\delta/D)^{3/2}$ for various resonators similar to the resonators shown in FIG. 3 (the porosity of which is substantially zero). Each curve corresponds to the characterization of one resonator. According to the model described above, the steeper the slope of a curve, the more the resonator is rigid. It is possible to deduce from the slope the effective Young's modulus E* if small strains are assumed.

The straight line (a) corresponds to a numerical simulation of a resonator the effective shear modulus of which is 1.2 MPa. The straight line (b) corresponds to a numerical simulation of a resonator the effective shear modulus of which is 2.8 MPa. These two straight lines may serve as points of comparison for the different figures.

Figure 8:
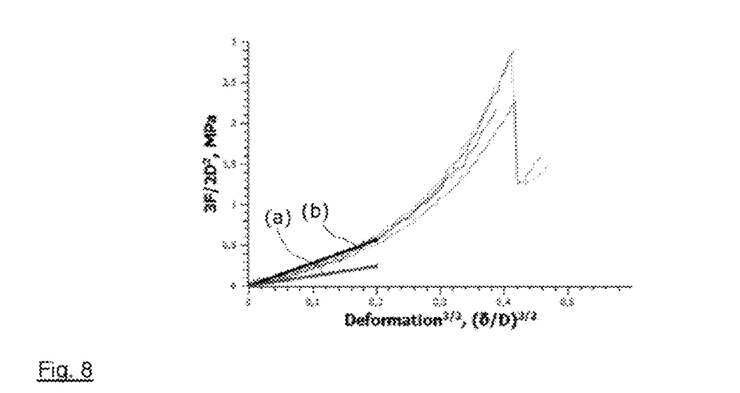
FIG. 8 is a mechanical characterization of a plurality of bead resonators that are different from the invention.

FIG. 8 is a mechanical characterization of a plurality of bead resonators that are different from the invention. It illustrates the variation in the applied normal force, normalized by $(3/2) \cdot D^2$, as a function of the ratio $(\delta/D)^{3/2}$ for various resonators similar to the resonators shown in FIG. 4 (the porosity of which is 70% before drying), which resonators are different from the invention. Each curve corresponds to the characterization of one resonator. The straight line (a) corresponds to a numerical simulation of a resonator the effective shear modulus of which is 1.2 MPa. The straight line (b) corresponds to a numerical simulation of a resonator the effective shear modulus of which is 2.8 MPa.

Figure 9:
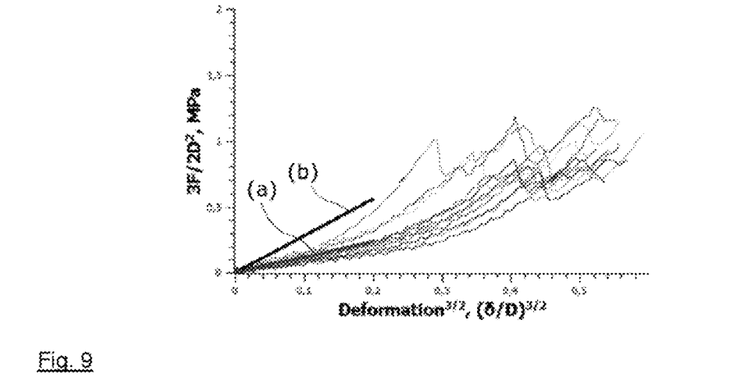
FIG. 9 is a mechanical characterization of a plurality of bead resonators according to one embodiment of the invention.

FIG. 9 is a mechanical characterization of a plurality of bead resonators according to one embodiment of the invention. It illustrates the variation in the applied normal force, normalized by $(3/2) \cdot D^2$, as a function of the ratio $(\delta/D)^{3/2}$ for various resonators similar to the resonators shown in FIG. 6 according to one embodiment of the invention (the porosity of which is 40%). Each curve corresponds to the characterization of one resonator. The straight line (a) corresponds to a numerical simulation of a resonator the effective shear modulus of which is 1.2 MPa. The straight line (b) corresponds to a numerical simulation of a resonator the effective shear modulus of which is 2.8 MPa.

Figure 10:
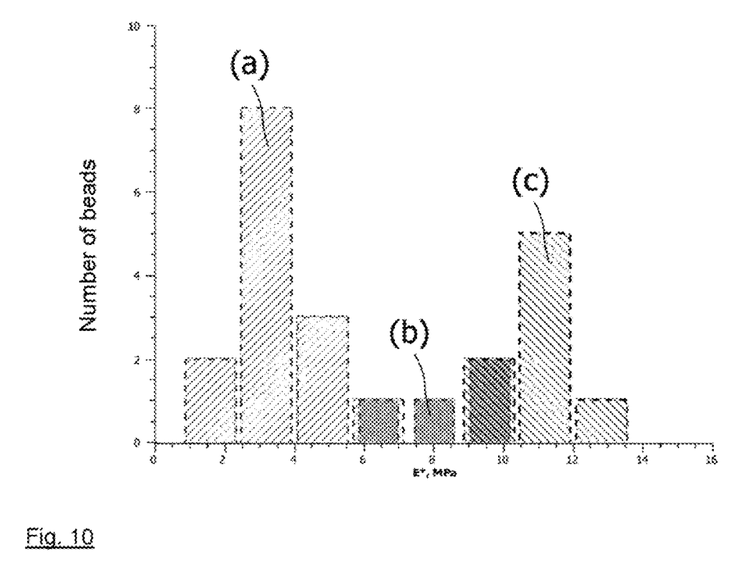
FIG. 10 is a histogram of number of resonators characterized as a function of a given effective Young's-modulus interval.

FIG. 10 is a histogram of number of resonators characterized as a function of a given effective Young's-modulus interval. This histogram illustrates the distribution of the Young's modulus of three populations of the described beads. The population (a) (bars hatched from bottom left to top right) correspond to the resonators according to one embodiment of the invention described with reference to FIG. 6. The population (b) (bars shaded gray) corresponds to resonators according to an embodiment that is different from the invention, corresponding to FIG. 4. The population (c) (bars hatched from bottom right to top left) correspond to resonators according to one embodiment that is different from the invention, corresponding to FIG. 3.

The non-porous resonators (c) have an effective Young's modulus substantially equal to 6 MPa whereas the porous resonators according to one embodiment of the invention (a) have an effective modulus substantially equal to 2 MPa. The latter are much softer. The measurements carried out on the resonators (c) show the importance of the initial porous structure on the drying and, consequently, on the porous structure of the final material: when the resonators are prepared using the process used to produce the beads (c), with droplets of emulsion that do not adhere to one another, the pores of the polymerized material are not connected. When the water escapes from the pores, the pores are observed to close, during the drying, and the beads, which initially have a porosity of 30%, are, at the end of drying, much more dense and less compressible. This effect is illustrated in FIGS. 7 and 9: the slope corresponding to the measurements carried out on the resonators (c) is higher on average than for the measurements corresponding to the resonators (a).

Figure 11:
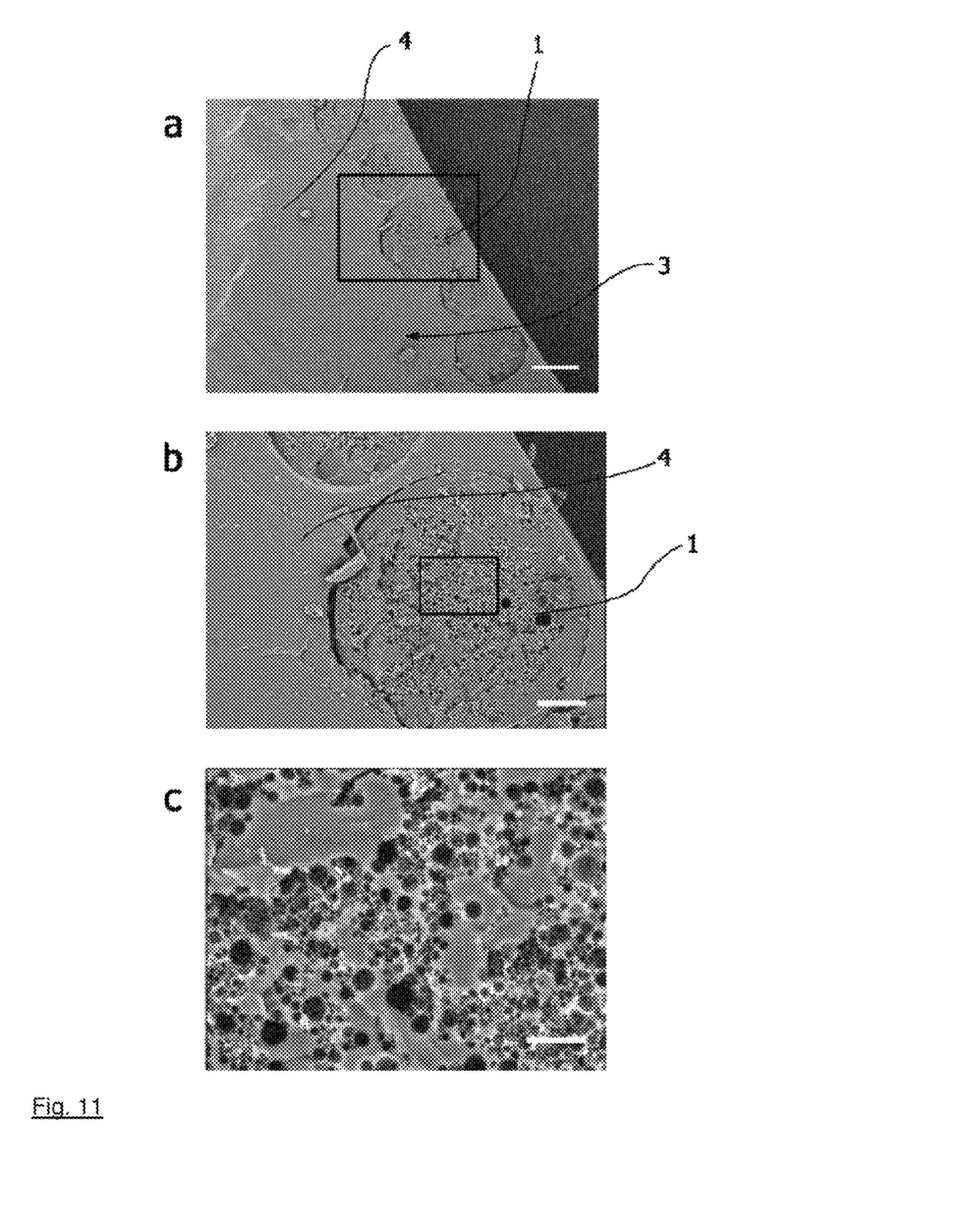
FIG. 11 shows scanning electron micrographs of an acoustic device according to one embodiment of the invention.

FIG. 11 shows scanning electron micrographs of an acoustic device 3 according to one embodiment of the invention.

Panel a of FIG. 11 is a micrograph of a cross section of an acoustic device 3. A plurality of resonators 1, prepared according to one embodiment of the invention described with reference to FIG. 6, is surrounded by a matrix 4. In this embodiment of the invention, the propagation speed of sound in the matrix 4 is high. Advantageously, the speed of propagation of sound in the matrix is higher than 500 m·s$^{-1}$. Advantageously, the speed of propagation of sound in the matrix is substantially equal to 1000 m·s$^{-1}$. In this particular embodiment of the invention, the matrix is made of cross-linked PDMS. The scale bar shown corresponds to 300 µm.

The propagation speed of sound in the PDMS of the matrix is substantially equal to 1000 m·s$^{-1}$. In addition, the propagation speed of sound in the porous PDMS used to produce the resonators of FIG. 6 is substantially equal to 80 m·s$^{-1}$. Advantageously, the ratio between the speed of sound in the matrix and the speed of sound in the resonators is higher than 5 and more advantageously higher than 10.

Panel b of FIG. 11 is a micrograph of a detail of panel a of FIG. 11, corresponding to the black frame of panel a. The scale bar shown corresponds to 100 µm.

Panel c of FIG. 11 is a micrograph of a detail of panel b of FIG. 11, corresponding to the black frame of panel b. The scale bar shown corresponds to 20 µm.

The matrix 4 allows, inter alia, sedimentation of the bead resonators to be prevented. After the preparation of the resonators, the resonators are introduced into the matrix 4 in order to prepare a dispersion of resonators. In the case of a matrix made of PDMS, it is possible to cross-link the PDMS after the incorporation of the resonators in order to stop the sedimentation. Generally, the matrix is a solid, with a low shear modulus. In another embodiment of the invention, a Bingham fluid may be used as matrix.

It is possible to use, in various embodiments of the invention, a matrix including carbopol (registered trademark), a latex (such as of polyisoprene of natural or synthetic origin), a polyacrylamide gel, an agarose gel, a gel based on guar (polysaccharide) or elastomers. Generally, the material of the matrix advantageously possesses a low shear modulus comprised between 0.1 MPa and 1 GPa and preferably between 0.1 MPa and 10 MPa.

To incorporate the resonators, according to the embodiments of the invention, into the matrix, the matrix must possess fluid properties. However, these properties may be in contradiction with the need to use a compressible resonator: the fluid may flow into the pores connected to the exterior and thus decrease the compressibility of a resonator. The inventors have discovered that by using pores of a diameter advantageously smaller than 100 µm and preferably smaller than 200 µm, the Laplace pressure is sufficiently high to slow the rate of penetration of the fluid into the resonator or to stop it. These conditions depend on the fluid used to produce the matrix. In the case of use of a cross-linkable polymer as matrix, the penetration of the fluid may be sufficiently slowed only during the time separating the dispersion of the resonators and the cross-linking of the matrix.

Figure 12:
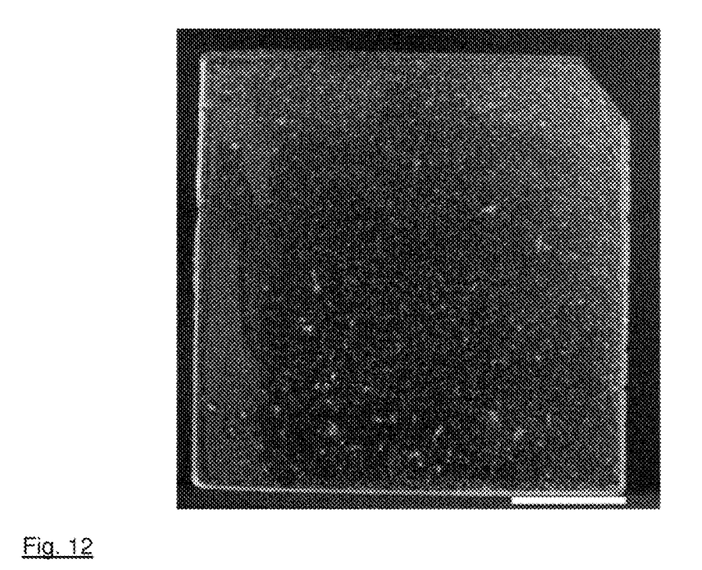
FIG. 12 is a photograph of one embodiment of the acoustic device.

FIG. 12 is a photograph of one embodiment of the acoustic device 3. The scale bar shown represents 2 cm. In this embodiment of the invention, the white spots correspond to the various resonators dispersed in a PDMS matrix.

Figure 13:
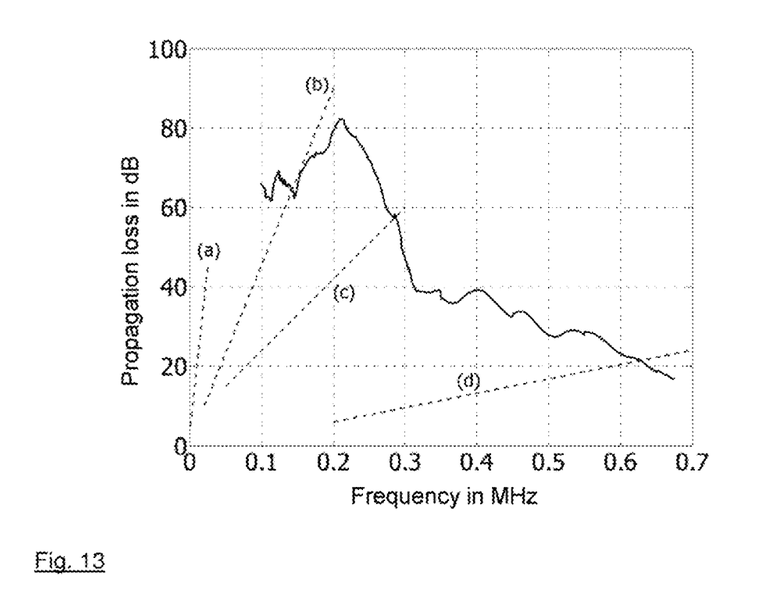
FIG. 13 illustrates the propagation loss associated with the acoustic device.

FIG. 13 illustrates the propagation loss associated with the acoustic device. This propagation loss is achieved by dispersing resonators in a matrix made of a yield-stress fluid (here a carbopol-based aqueous phase). The propagation loss PL of the acoustic device, shown by the solid line, is defined by:

$$PL = -20\log\frac{P_t}{P_0} \quad (6)$$

where $P_t$ is the amplitude of the transmitted pressure and $P_0$ is the amplitude of the incident pressure. Propagation loss quantifies what is absorbed, scattered and reflected by the material. Propagation loss takes into account the variation in acoustic impedance between the exterior medium and the material. The propagation loss depends on the exterior medium. Linear fits of the propagation loss of various commercially available acoustic devices of the prior art are illustrated by the dashed lines: (a) Alberich Tile (registered trademark), (b) Alberich SF5048 (registered trademark), (c) Alberich F48 (registered trademark), (d) Alberich F28 (registered trademark).

Figure 14:
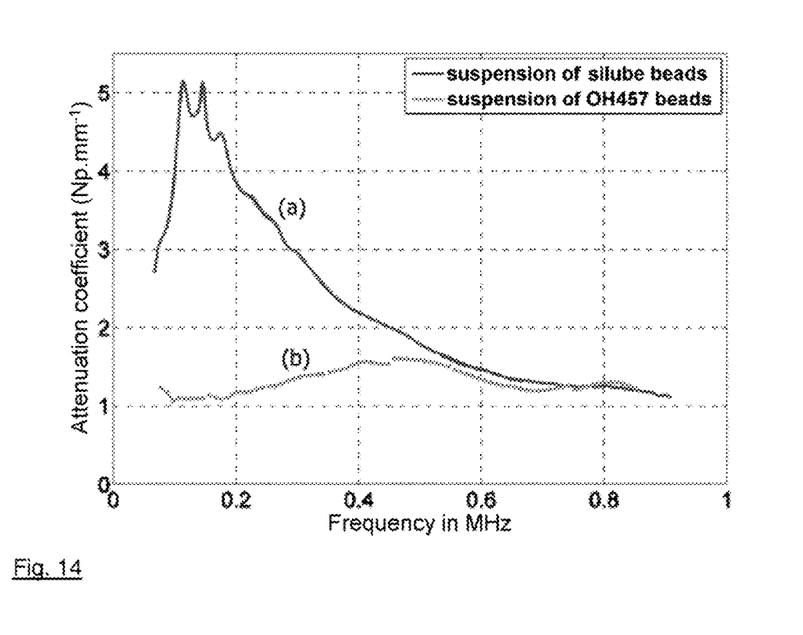
FIG. 14 illustrates the attenuation coefficient associated with the acoustic device as a function of the frequency of the incident wave.

FIG. 14 illustrates the attenuation coefficient associated with the acoustic device. In this embodiment of the invention, the acoustic device consists of resonators dispersed in a yield-stress fluid (a carbopol-based aqueous phase). The acoustic attenuation is illustrated as a function of the frequency of the incident wave. The attenuation coefficient $\alpha$ is defined by:

$$P_t = P_0 f(Z) e^{-\alpha x} \quad (7)$$

where x is the thickness of the acoustic device passed through, f(Z) is a function of the acoustic impedances of the exterior material $Z_{ext}$ and of the impedance of the acoustic device $Z_{eff}$:

$$f(Z) = \frac{4Z_{ext}Z_{eff}}{(Z_{ext} + Z_{eff})^2} \quad (8)$$

The acoustic impedance of a medium may be written $Z = \rho \cdot c_L$ where $\rho$ is the volume density of the medium in question and $c_L$ the longitudinal phase speed within the same material.

Measured attenuation coefficients are shown in FIG. 14 by the dark line (a) for an embodiment of the invention corresponding to the resonators described with reference to FIG. 6, and by the light line (b) for an embodiment that is different from the invention, corresponding to FIG. 4.

The attenuation quantifies only what is absorbed within the material and not the effect of the variation in impedance between the exterior medium and the actual material. Thus, this quantity does not depend on the amount of energy dissipated by reflection at the various interfaces between the device and the exterior medium. It is therefore an intrinsic property of the actual material.

Figure 15:
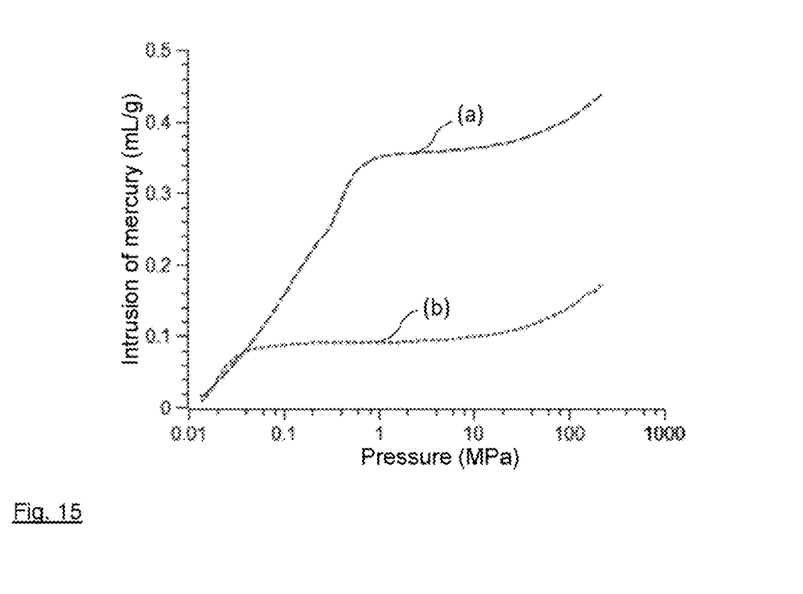
FIG. 15 illustrates measurements of the porosity of resonators according to one embodiment of the invention.

FIG. 15 illustrates measurements of resonator porosity. Porosity was determined by measuring the intrusion of mercury into the resonators. Curve (a) (long dashes) corresponds to the intrusion of mercury into resonators 1 according to one embodiment of the invention, as a function of the pressure applied to a system comprising the resonators 1 and the mercury. Curve (b) (short dashes) correspond to the intrusion of mercury into resonators that are different from the invention, as a function of the pressure applied to a system comprising resonators that are different from the invention and the mercury. The resonators corresponding to the curves (a) and (b) were made from PDMS.

The resonators measured in curve (a) correspond to the resonators illustrated in FIG. 6. The surfactant called Silube was used to produce them. The resonators measured in curve (b) correspond to the resonators illustrated in FIG. 4. The surfactant called OH457 was used to produce them. The specific volume of intrusion of the mercury varied with the porosity of the resonators for pressures comprised between 0.1 MPa and 10 MPa. The increase of the slope of the two curves for pressures higher than 10 MPa corresponds to the compression of the PDMS.

The measurement of the intrusion of the mercury allows the porosity of the resonators to be calculated when the pores are interconnected. In the case of the resonators 1 according to one embodiment of the invention (curve (a)), the inventors have calculated a porosity equal to the volume fraction of the aqueous first phase 6, equal to 30% in this example.

Figure 16:
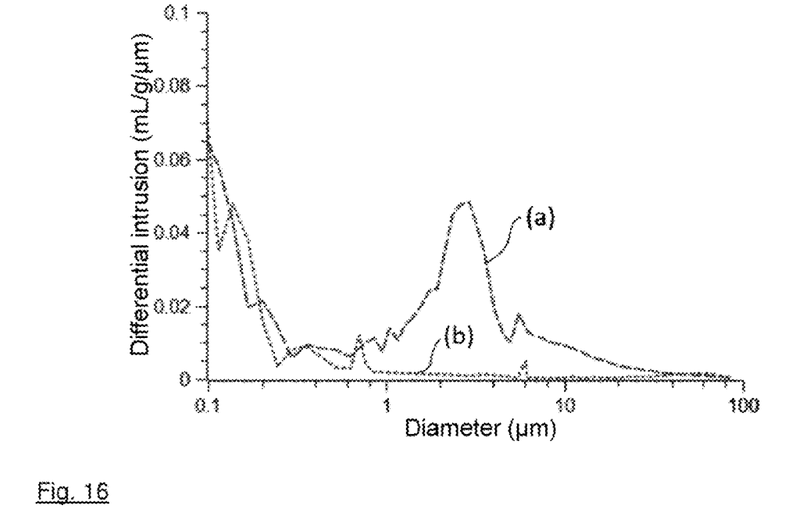
FIG. 16 illustrates a distribution of the diameters of the interconnecting pores of two types of resonators.

FIG. 16 illustrates a distribution of the diameter of the interconnecting pores of two types of resonators. Curve (a) corresponds to resonators according to one embodiment of the invention (for example the resonators 1 illustrated in FIG. 6, produced using the surfactant Silure), and curve (b) corresponds to resonators according to an embodiment that is different from the invention (for example the resonators illustrated in FIG. 4, produced using the surfactant OH457). The measured average diameter of the interconnecting pores of the resonators 1 corresponding to the curve (a) is 5 µm.

Figure 17:
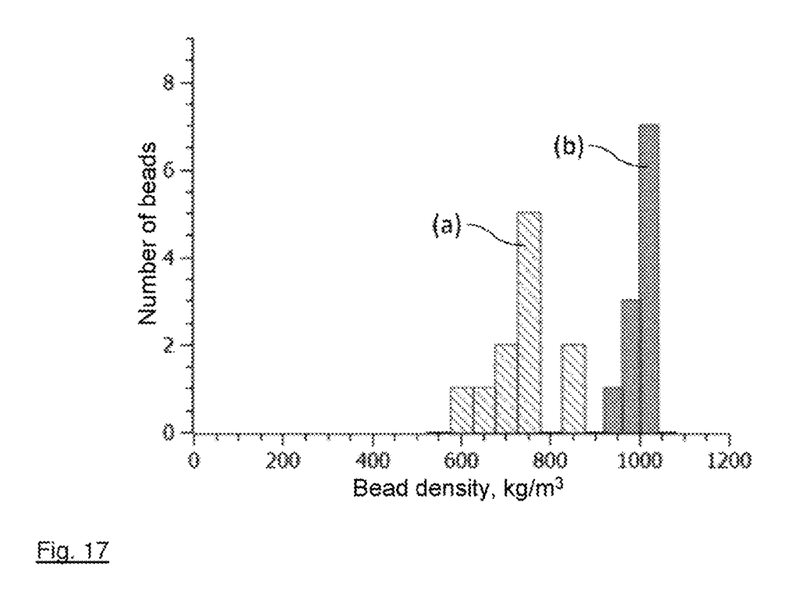
FIG. 17 illustrates the mass-density distribution (a) of resonators produced according to one embodiment and (b) of resonators that are different from the invention.

FIG. 17 illustrates the mass-density distribution of various resonators. The hatched bars (a) of the histogram of FIG. 17 correspond to density measurements carried out on resonators 1 according to one embodiment of the invention. The shaded bars (b) of the histogram of FIG. 17 correspond to density measurements carried out on resonators that are different from the invention, for example of the type shown in FIG. 4. FIG. 17 illustrates the optimization of the density of a resonator 1 according to one embodiment of the invention: in this example, the density is comprised between 500 and 850 kg·m$^{-3}$. Generally, the density of a resonator 1 according to one embodiment of the invention is strictly higher than 200 kg·m$^{-3}$, preferably strictly higher than 400 kg·m$^{-3}$ and preferably higher than 600 kg·m$^{-3}$.

The invention claimed is:

1. A porous acoustic bead resonator, wherein:
   Wherein the resonator is constructed from a polymer;
   a Young's modulus of said polymer is lower than 1 GPa;
   a porosity of said resonator is comprised between 20% and 50%;
   most of the pores of said resonator are filled with a gas; and
   most of said pores are interconnected, via at least one pore, with an exterior of said resonator.

2. The resonator as claimed in claim 1, wherein the diameter of each said pore connected with the exterior of said resonator is smaller than or equal to 200 µm, preferably smaller than or equal to 100 µm and preferably smaller than or equal to 20 µ·m.

3. An acoustic device including a plurality of resonators as claimed in claim 1 and a matrix surrounding said bead resonators, the speed of propagation of sound in said matrix being higher than or equal to 500 m·s-1.

4. The device as claimed in claim 3, wherein said matrix is suitable for preventing the sedimentation of said bead resonators.

5. The device as claimed in claim 3, wherein said matrix is solid.

6. The device as claimed in claim 3, wherein the material of said matrix is a Bingham fluid.

7. A process for manufacturing a porous acoustic bead resonator, a material of said resonator presenting a Young's modulus lower than 1 GPa, the process including at least the steps of:

a) preparing a primary emulsion between, on the one hand, an aqueous first phase and, on the other hand, a second phase including at least one type of monomer and one surfactant;

b) preparing a secondary emulsion between, on the one hand, said primary emulsion and, on the other hand, an aqueous third phase, so as to form droplets of said primary emulsion;

c) cross-linking said monomers of said droplets of primary emulsion so as to form said resonator;

d) drying the resonator so as to replace the first aqueous phase with a gas coming from outside, pores being then filled with said gas, a majority of said pores of the resonator being interconnected with one another, and with the exterior via at least one pore, and a porosity of said resonator being comprised between 20% and 50%.

8. The process as claimed in claim 7, wherein the cross-linking of step c) is carried out by heating.

9. The process as claimed in claim 7, wherein the cross-linking step c) is carried out via exposure to ultraviolet radiation.

10. The process as claimed in claim 7, wherein the formation of droplets of said first phase is waited for between step b) and step c).

11. The process as claimed in claim 7, wherein said primary emulsion is prepared at least using a method chosen from: a dropwise method, a shear-mixing method using an instrument employing a mixing blade, an ultrasonic method, a flow-focusing method, a co-flow method, a T-junction method and a step-emulsification method.

12. The process as claimed in claim 7, wherein said secondary emulsion is prepared at least using a method chosen from: a dropwise method, a shear-mixing method using an instrument employing a mixing blade, an ultrasonic method, a flow-focusing method, a co-flow method, a T-junction method and a step-emulsification method.

13. The process as claimed in claim 7, wherein the cross-linking of the monomer of said second phase is carried out droplet by droplet of said primary emulsion in a fluidic system.

14. The porous acoustic bead resonator of claim 1, wherein the resonator comprises a polymer having a low shear modulus.

* * * * *